United States Patent
Weber et al.

(10) Patent No.: US 9,829,975 B2
(45) Date of Patent: Nov. 28, 2017

(54) GAZE-CONTROLLED INTERFACE METHOD AND SYSTEM

(71) Applicant: Auckland UniServices Limited, Auckland (NZ)

(72) Inventors: Gerald Artur Norbert Weber, Auckland (NZ); Christof Lutteroth, Auckland (NZ); Abdul Moiz Penkar, Kingsland (NZ)

(73) Assignee: Auckland Uniservices Limited, Auckland (NZ)

( * ) Notice: Subject to any disclaimer, the term of this patent is extended or adjusted under 35 U.S.C. 154(b) by 0 days.

(21) Appl. No.: 14/912,445

(22) PCT Filed: Aug. 27, 2014

(86) PCT No.: PCT/NZ2014/000178
§ 371 (c)(1),
(2) Date: Feb. 17, 2016

(87) PCT Pub. No.: WO2015/030607
PCT Pub. Date: Mar. 5, 2015

(65) Prior Publication Data
US 2016/0195924 A1    Jul. 7, 2016

(30) Foreign Application Priority Data

Aug. 27, 2013   (AU) ............................... 2013903250

(51) Int. Cl.
G09G 5/00      (2006.01)
G06F 3/01      (2006.01)
G06F 3/03      (2006.01)

(52) U.S. Cl.
CPC ............ *G06F 3/013* (2013.01); *G06F 3/0304* (2013.01)

(58) Field of Classification Search
CPC ............................... G06F 3/013; G06F 3/0304
See application file for complete search history.

(56) References Cited

U.S. PATENT DOCUMENTS 5,859,642 A *  1/1999  Jones ...................... G06F 3/011
                                                    345/156
6,243,076 B1   6/2001  Hatfield
(Continued)

FOREIGN PATENT DOCUMENTS

| WO | WO-2013/060892 A1 | 5/2013 |
| WO | WO-2014/024159 A1 | 2/2014 |
| WO | WO-2015/030607    | 3/2015 |

OTHER PUBLICATIONS

"International Application No. PCT/NZ2014/000178, International Preliminary Report on Patentability dated Jul. 24, 2015", (Jul. 24, 2015), 7 pgs.

(Continued)

*Primary Examiner* — Insa Sadio
(74) *Attorney, Agent, or Firm* — Schwegman Lundberg & Woessner, P.A.

(57) ABSTRACT

A gaze-controlled interface system for enabling a user to interact with an electronic visual work presented on an electronic display screen. The system has an electronic display screen configured to present the electronic visual work and an eye gaze tracker configured to sense the user's gaze position on the display screen and generate representative gaze signal. A processor receives and processes the gaze signal to enable the user to interact with the electronic visual work based on gaze.

30 Claims, 8 Drawing Sheets

(56) References Cited

U.S. PATENT DOCUMENTS

| | | | |
|---|---|---|---|
| 8,185,845 B2 | 5/2012 | Bjorklund et al. | |
| 9,372,605 B2 | 6/2016 | Invernizzi | |
| 2012/0086645 A1* | 4/2012 | Zheng ................ | G06F 3/013 345/168 |
| 2014/0055337 A1 | 2/2014 | Karlsson | |
| 2014/0247232 A1 | 9/2014 | George-Svahn et al. | |

OTHER PUBLICATIONS

"International Application No. PCT/NZ2014/000178, International Search Report and Written Opinion mailed Nov. 24, 2014", (Nov. 24, 2014), 14 pgs.

Biedert, Ralf, et al., "The Text 2.0 Framework: Writing Web-Based Gaze-Controlled Realtime Applications Quickly and Easily", In Proceedings of the International Workshop on Eye Gaze in Intelligent Human Machine Interaction (EGIHMI) Held in Conjunction with IUI 2010, (2010), 4 pgs.

Penkar, Abdul Moiz, et al., "Designing for the Eye—Design Parameters for Dwell in Gaze Interaction", Proceedings of the 24th Australian Computer-Human Interaction Conference, OZCHI, Nov. 26-30, 2012, (Nov. 26, 2012), 10 pgs.

Penkar, Abdul Moiz, et al., "Eyes Only: Navigating Hypertext with Gaze", Department of Computer Science, University of Auckland, printed in Human-Computer Interaction—INTERACT 2013, 14th IFIP TC 13 International Conference, Cape Town, South Africa, Sep. 2-6, 2013, Proceedings, Part II, (2013), 153-169.

Tien, Geoffrey, et al., "Improving Hands-free Menu Selection Using Eyegaze Glances and Fixations", Proceedings of the 2008 Symposium on Eye Tracking Research & Applications, Mar. 26-28, 2008, (Mar. 26, 2008), 4 pgs.

"SR Labs system demonstrated at 3m30s", Screenshot of YouTube Video at https://www.youtube.com/watch?v=JtvpUQykqWA&feature=youtu.be&t=3m30s, (2017), 1 pg.

"The Tobii browser demonstrated at 12m50s", Screenshot of YouTube Video at https://www.youtube.com/watch?v=kbZk-DU1KPs&feature=youtu.be&t=12m50s, (2017), 1 pg.

* cited by examiner

GAZE-CONTROLLED INTERFACE METHOD AND SYSTEM

PRIORITY CLAIM TO RELATED APPLICATIONS

This application is a U.S. national stage application filed under 35 U.S.C. §371 from International Application Serial No. PCT/NZ2014/000178, which was filed 27 Aug. 2014, and published as WO2015/030607 on 5 Mar. 2015, and which claims priority to Australian Application No. 2013903250, filed 27 Aug. 2013, which applications and publication are incorporated by reference as if reproduced herein and made a part hereof in their entirety, and the benefit of priority of each of which is claimed herein.

FIELD OF THE INVENTION

The invention relates to a gaze-controlled interface to enable a user to interact with an electronic visual work via eye gaze.

BACKGROUND TO THE INVENTION

Various gaze-controlled interfaces have been proposed for use as input devices for everyday computing or computing devices. Pointing with eye gaze tracking is relatively straightforward, but using eye gaze tracking for performing actions, such as clicks, is challenging. Inaccuracy and inadvertent clicking are the main problems encountered when using eye gaze tracking as an input device for computing devices. The inaccuracy can be caused by gaze tracker error, or it can stem from fundamental limitations such as involuntary eye movements, including jitter and drifts (and the lack of pixel-pointing precision). Inadvertent clicking, also known as the Midas touch problem, occurs because eyes are sensory (input) organs and this creates a mismatch when using them as a means for communicating intention to a computer.

Techniques devised to perform actions (or mimic mouse clicks) on activatable elements or 'activatables', such as hyperlinks, buttons, fields or the like for example, are called 'click alternatives'. Various click alternatives have been proposed for encoding an action with eye gaze. One click alternative is called dwell or fixation, which triggers an action when the gaze dwells on (i.e. fixates) the same area of the display screen for a defined time interval. The dwell click alternative primarily suffers from inadvertent clicking, especially when there are many activatables within a gaze area. To address such problems, improvements to the dwell click alternative can be made by automatically magnifying the area being gazed at if there are multiple activatables. However, magnification brings its own issues such as reducing the content visible on the screen and visual distraction. In addition to this, conscious eye control is generally unnatural and tiring. As a result, click alternatives using blinking, winking or eye gestures are generally not preferred.

Other improved dwell click alternatives use dwell in combination with confirm buttons. This design tries to control inadvertent clicking by providing a confirmation step. In one known form, a single confirm button is presented temporarily to the user when they dwell upon an activatable. The confirm button may be presented near or next to the activatable or alternatively in the margin of the screen. When dwelling on an activatable, the user must then look and dwell on the confirm button to 'click' the activatable. In another known form, multiple confirm buttons may be presented temporarily, each confirm button corresponding to a respective activatable in the user's gaze area on screen. Again, the multiple confirm buttons may be presented near or around the gaze area or alternatively in a separate margin to the main display screen. The advantage of multiple confirm buttons over a single confirm button is to account or compensate for the inaccuracy and imprecision of gaze trackers, in a similar way to magnification. When using multiple confirm buttons, the user must be informed which confirm button belongs to which activatable. In one known form, text labels on the confirm buttons match the activatables. In another known form, connection lines are drawn between activatables and the associated confirm buttons. In these forms, the temporary confirm buttons occlude the electronic visual work and change their positions as the gaze moves between activatables.

While reducing inadvertent clicks compared to using dwell alone, the above single and multiple confirm click alternatives can be distracting and tiring for a user. Firstly, such approaches utilise temporarily appearing confirm buttons that appear on the screen content or in a margin when the user is dwelling on an activatable and change as the user dwells on a new activatable or cluster of activatables. The constant appearing and disappearing of confirm buttons as the user gazes in different areas can be very distracting. Additionally, before actuating a confirm button by dwelling on it, the user must check that the confirm button corresponds to the activatable they intended to click via the text labels or connection lines. This can require the user to look back and forward between the intended activatable and the confirm button to check the association, e.g. match a text label on the confirm button with the text of the activatable, or trace the connection lines. This can be extremely tiring and time consuming in the case of the multiple confirm button approach as the user must then traverse the various confirm buttons arbitrarily presented and select the correct one. Additionally, depending on the dwell time thresholds, confirm buttons may change as the user moves their gaze from the activatable area of interest across to the confirm buttons, which may be presented in the margin. If the confirm buttons are presented near the gaze area, they can occlude screen content and cause distraction.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the invention to provide an improved gaze-controlled interface method and system to enable a user to interact with electronic visual works, or to at least provide the public with a useful choice.

SUMMARY OF THE INVENTION

In a first aspect, the invention broadly consists in a method of providing a gaze-controlled interface for a user to interact with an electronic visual work presented on an electronic display screen, comprising: providing a number of confirm buttons in the vicinity of the display screen at known fixed locations, each confirm button having a different fixed respective button visual identifier; processing the electronic visual work to identify activatable elements of at least one type; assigning an element visual identifier to each of the identified activatable elements, each element visual identifier corresponding to one of the button visual identifiers; modifying the display of the electronic visual work to present the assigned element visual identifiers for at least a portion of the displayed activatable elements; receiving a gaze signal representing the user's gaze position on the display screen from an eye gaze tracker; sensing the user's gaze dwelling on or near an activatable element of the displayed electronic visual work based on the gaze signal; activating the confirm button having the button visual identifier corresponding to the element visual identifier assigned to the dwelled-on activatable element such that the confirm button is temporarily linked to the dwelled-on activatable element so that actuation of the activated confirm button causes activation of the dwelled-on activatable element; sensing actuation of the activated confirm button in response to the user's gaze dwelling on the activated confirm button based on the gaze signal; and activating the activatable element in response to the sensed actuation of the activated confirm button.

In an embodiment, the method comprises providing a predetermined number of confirm buttons in the vicinity of the display screen at known fixed locations, each confirm button having a different fixed respective button visual identifier.

In an embodiment, the confirm buttons are electronically generated graphical confirm buttons presented on the electronic display screen.

In an embodiment, the method comprises providing the confirm buttons in a margin relative to the displayed electronic visual work.

In an embodiment, the confirm buttons are static in that they are permanently presented at their respective fixed locations while the electronic visual work is displayed.

In an embodiment, the confirm buttons are physical confirm buttons in the form of physical markers or targets or indicia provided adjacent or about the periphery of the electronic display screen. In one form, the confirm buttons are provided along one or multiple frame work edges or borders of the electronic display screen or the housing or casing of an electronic device which provides the electronic display screen. In another form, the physical confirm buttons are provided on a panel or frame that is retrofittable to the electronic display screen or an electronic device which provides the electronic display screen. In an embodiment, the physical confirm buttons are providing by printing, marking, or stickers.

In an embodiment, the button visual identifiers are colour-based, with different colours associated with each confirm button, and each element visual identifier corresponding to one of the colours of the confirm buttons.

In an embodiment, the button visual identifiers are pattern-based, with different patterns associated with each confirm button, and each element visual identifier corresponding to one of the patterns of the confirm buttons.

In an embodiment, the button visual identifiers are shape-based, with different shapes associated with each confirm button, and each element visual identifier corresponding to one of the shapes of the confirm buttons.

In an embodiment, the button visual identifiers are based on a combination of any two or more of colour, pattern, and/or shape, with a combination of any two or more colours, patterns, and/or shapes associated with each confirm button, and each element visual identifier corresponding to one of the combinations associated with the confirm buttons.

In one embodiment, the method comprises processing the electronic visual work to identify activatable elements of a single type. In another embodiment, the method comprises processing the electronic visual work to identify activatable elements of multiple types.

In an embodiment, the activatable elements are any one or more of the following types: icons, widgets, areas, menus, buttons, fields, hyperlinks.

In an embodiment, the step of assigning an element visual identifier to each identified activatable element comprises assigning element visual identifiers such that the minimum distance between activatable elements having the same or similar element visual identifiers is maximised.

In an embodiment, the step of assigning an element visual identifier to each identified activatable element comprises assigning element visual identifiers so that for neighbouring activatable elements the distance between the confirm buttons having button visual identifiers corresponding to the assigned element visual identifiers of the neighbouring activatable elements is maximized.

In one embodiment, the step of modifying the display of the electronic visual work to present the assigned element visual identifiers comprises presenting the assigned element visual identifiers for all displayed activatable elements. In another embodiment, the step of modifying the display of the electronic visual work to present the assigned element visual identifiers comprises dynamically presenting the assigned element visual identifiers for a portion of the displayed activatable elements that are captured within a predefined region centered about the user's gaze position on the display screen.

In one embodiment, the step of modifying the display of the electronic visual work to present the assigned element visual identifiers comprises providing an electronic masking overlay over at least a portion of the presented electronic visual work.

In an embodiment, where the button and element visual identifiers correspond to colours, the masking overlay highlights, borders, outlines, underlines or otherwise applies for display the assigned colours of the element visual identifiers to their respective activatable elements of the electronic visual work.

In an embodiment, where the button and element visual identifiers correspond to patterns, the masking overlay highlights, outlines, borders, underlines or otherwise applies for display the assigned patterns of the element visual identifiers to their respective activatable elements of the electronic visual work.

In an embodiment, where the button and element visual identifiers correspond to shapes, the masking overlay highlights, outlines, borders, underlines or otherwise applies for display the assigned shape of the element visual identifiers to their respective activatable elements of the electronic visual work.

In another embodiment, the step of modifying the display of the electronic visual work to present the assigned element visual identifiers comprises modifying the data file of the electronic visual work to modify the display or control the rendering of the activatable elements in the electronic visual work to display their respective assigned element visual identifier.

In an embodiment, the step of modifying the display of the electronic visual work comprises modifying the layout of the electronic visual work to modify the relative position of activatable elements to increase the separation of activatable elements having the same assigned element visual identifier.

In an embodiment, the step of sensing the user's gaze dwelling on or near an activatable element based on the gaze signal comprises sensing whether the user's gaze has being substantially stationary for a time interval corresponding to a first time threshold. In one form, the user's gaze is considered to be substantially stationary if for the time interval corresponding to the first time threshold each successive gaze signal sample representing the user's gaze position is within a predetermined distance of the previous sample defined by a predetermined distance threshold or parameter. In one form, successive gaze position samples are considered to be within a predetermined distance if one of the sample positions falls within a circular gaze area of predetermined radius centered about the other gaze position sample.

In one embodiment, the method comprises only activating the confirm button having the button visual identifier corresponding to the assigned element visual identifier of the activatable element being dwelled on.

In another embodiment, the method comprises activating any confirm button having a button visual identifier that corresponds to an assigned element visual identifier of any activatable elements falling within a predetermined activation zone relative to a gaze area being dwelled on as defined by the gaze signal. In one form, the predetermined activation zone is configured to be of a size that captures the maximum number of activatable elements in the vicinity of the gaze area but without capturing activatable elements having the same assigned element visual identifier.

In an embodiment, sensing the user's gaze dwelling on an activated confirm button comprises sensing the user's gaze as being substantially stationary on a confirm button for a time interval corresponding to a second time threshold.

In an embodiment, the electronic visual work is any one of the following: webpage, document, or graphical user interface.

In a second aspect, the invention broadly consists in a method of providing a gaze-controlled interface for a user to interact with an electronic visual work presented on an electronic display screen, comprising: providing a number of confirm buttons in the vicinity of the display screen at known fixed locations, each confirm button having a different fixed respective button visual identifier; processing the electronic visual work to identify activatable elements of at least one type; assigning an element visual identifier to each of the identified activatable elements, each element visual identifier corresponding to one of the button visual identifiers; modifying the display of the electronic visual work to present the assigned element visual identifiers for at least a portion of the displayed activatable elements; receiving a gaze signal representing the user's gaze position on the display screen from an eye gaze tracker; recording gaze data representing the received gaze signal as the user gazes the displayed electronic visual work; sensing the user's gaze dwelling on a confirm button based on the gaze signal; analysing the recorded gaze data prior to the confirm button being dwelled on to determine which activatable element, having an assigned element visual identifier that corresponds to the button visual identifier of the confirm button being dwelled on, was intended to be activated by the user; and activating the determined activatable element.

In an embodiment, the method comprises recording the gaze data when the user's gaze is sensed as dwelling on or near an activatable element of the displayed electronic visual work.

In an embodiment, recording gaze data further comprises recoding the gaze signal and data indicative of any nearby activatable elements falling within a predetermined zone relative to the gaze signal.

In an embodiment, analysing the recorded gaze data to determine the activatable element intended to be activated by the user comprises selecting the activatable element that the user has most recently dwelled on or nearby for a predetermined time threshold.

In an embodiment, analysing the recorded gaze data to determine the activatable element intended to be activated by the user comprises selecting the activatable element that the user has dwelled on or nearby for the longest within a certain time period prior to the confirm button being dwelled on.

In an embodiment, analysing the recorded gaze data to determine the activatable element intended to be activated by the user comprises selecting the activatable element based on the gaze path represented by the gaze data prior to the confirm button being dwelled on. In this embodiment, the method may further comprise excluding from selection activatable elements that are determined to lie only coincidentally on the gaze path between the most likely activatable element intended to be activated by the user and the confirm button dwelled on.

In an embodiment, analysing the recorded gaze data to determine the activatable element intended to be activated by the user comprises selecting the activatable element based on a combination of criteria.

In an embodiment, activating the determined activatable element comprises activating the determined activatable element only if the user's gaze is sensed, based on the gaze signal, as dwelling on the confirm button for a time interval corresponding to a predetermined time threshold.

The second aspect of the invention may have any one or more of the features mentioned in respect of the first aspect of the invention.

In a third aspect, the invention broadly consists in a gaze-controlled interface system for enabling a user to interact with an electronic visual work presented on an electronic display screen, comprising: an electronic display screen configured to present the electronic visual work; an eye gaze tracker configured to sense the user's gaze position on the display screen and generate representative gaze signal; and a processor operatively connected to the display screen and eye gaze tracker, and which is programmed to execute the methods of any one of the first or second aspects of the invention.

In a fourth aspect, the invention broadly consists in a non-transitory computer-readable medium having stored thereon computer executable instructions that, when executed on a processing device or devices, cause the processing device or devices to perform any one of the methods of the first or second aspects of the invention.

Also described is a fifth aspect comprising a method of providing a gaze-controlled interface for a user to interact with an electronic visual work presented on an electronic display screen, comprising: providing a number of confirm buttons in the vicinity of the display screen at known fixed locations, each confirm button having a different fixed respective button visual identifier; processing the electronic visual work to identify activatable elements of at least one type; assigning an element visual identifier to each of the identified activatable elements, each element visual identifier corresponding to one of the button visual identifiers; modifying the display of the electronic visual work to present the assigned element visual identifiers for at least a portion of the displayed activatable elements; receiving a gaze signal representing the user's gaze position on the display screen from an eye gaze tracker; sensing the user's gaze dwelling in a gaze area on or near an activatable element of the displayed electronic visual work based on the gaze signal and a first time threshold; activating at least the confirm button having the button visual identifier corresponding to the element visual identifier of the closest activatable element to the gaze area being dwelled on; sensing the user's gaze dwelling in a gaze area on an activated confirm button based on the gaze signal and a second time threshold; and activating the activatable element in response to the activated confirm button being dwelled on.

In an embodiment, the method comprises providing a predetermined number of confirm buttons in the vicinity of the display screen at known fixed locations, each confirm button having a different fixed respective button visual identifier.

In one embodiment, the confirm buttons are electronically generated graphical confirm buttons presented on the electronic display screen. In one form, the confirm buttons are presented in a margin area situated outside the main screen portion displaying the electronic visual work. In this embodiment, the confirm buttons are 'static' in that they are permanently presented at their respective fixed locations while the electronic visual work is displayed.

In another embodiment, the confirm buttons are in the form of physical markers or targets or indicia provided adjacent or about the periphery of the electronic display screen. In one form, the confirm buttons may be provided along one or multiple frame work edges or borders of the electronic display screen or the housing or casing of the electronic device which provides the electronic display screen. For example, the physical confirm buttons may be printed, markers, stickers, or otherwise formed or fixed to the surface of the housing or casing surrounding the electronic display screen.

In one embodiment, the button visual identifiers are colour-based, such as different colours associated with each confirm button. In such embodiments, each element visual identifier corresponds to one of the colours of the confirm buttons. In another embodiment, the button visual identifiers are pattern-based, such as different patterns associated with each confirm button. In such embodiments, each element visual identifier corresponds to one of the patterns of the confirm buttons. In another embodiment, the button visual identifiers are shapes such as indications of directions, for example well known conventions to indicate directions such as the clockface metaphor (e.g. in direction 3 o'clock) or a compass, or arrows. In such embodiments, each element visual identifier corresponds to one of the shapes of the confirm buttons.

In an embodiment, the electronic visual work may comprise a single type of activatable elements or multiple types of activatable elements. In one form, the electronic visual work may comprise any one or more activatable elements in the form of: hyperlinks, buttons, fields, or any other form of interactive, clickable, or actionable element in the context of electronic visual works.

In an embodiment, the step of assigning an element visual identifier to each identified activatable element comprises assigning element visual identifiers such that the distance between activatable elements having the same element visual identifier or similar element visual identifiers is maximised. In another embodiment, the minimum distance between the same or similar element visual identifiers in the electronic visual work is maximized. In yet another embodiment, the distance between the confirm buttons corresponding to neighbouring activatables is maximized.

In an embodiment, the step of modifying the display of the electronic visual work to present the assigned element visual identifiers comprises presenting the assigned element visual identifiers for all displayed activatable elements. In another embodiment, the step of modifying the display of the electronic visual work to present the assigned element visual identifiers comprises dynamically presenting the assigned element visual identifiers for a portion of the displayed activatable elements that are captured within a predefined region centered about the user's gaze position on the display screen.

In one embodiment, the step of modifying the display of the electronic visual work to present the assigned element visual identifiers comprises providing a screen or masking overlay over at least a portion of the presented electronic visual work. In one form, where the button and element visual identifiers correspond to colours, the masking overlay highlights, borders, outlines, underlines or otherwise applies the assigned colours of the element visual identifiers to their respective activatable elements. In another form, where the button and element visual identifiers correspond to patterns, the masking overlay highlights, outlines, borders, underlines or otherwise applies the assigned patterns of the element visual identifiers to their respective activatable elements. In another form, where the button and element visual identifiers correspond to shapes, the masking overlay highlights, outlines, borders, underlines or otherwise applies the assigned shape of the element visual identifiers to their respective activatable elements.

In another embodiment, the method of modifying the display of the electronic visual work to present the assigned element visual identifiers comprises modifying the data file of the electronic visual work to modify the display or control the rendering of the activatable elements in the electronic visual work to have the colour or pattern or shape of their assigned element visual identifier. In another form, the layout of the electronic visual work is modified in order to change the relative position of activatable elements, e.g. in order to increase separation of the activatable elements especially if they are assigned the same element visual identifier.

In an embodiment, the step of sensing the user's gaze dwelling on or near an activatable element based on the gaze signal and a first time threshold comprises sensing the user's gaze as being substantially stationary for a time interval corresponding to the first time threshold. In one form, the user's gaze is considered to be substantially stationary if for the time interval corresponding to the first time threshold each successive gaze signal sample representing the user's gaze position is near the previous sample. In one form, gaze point samples are considered to be near to each other if they are within a predetermined distance defined by a predetermined distance threshold or parameter. In one example, successive gaze position samples are considered to be near each other if one of the sample positions falls within a circular gaze area of predetermined radius centered about the other gaze position sample.

In one embodiment, the method comprises only activating the confirm button having the button visual identifier corresponding to the assigned element visual identifier of the activatable element being dwelled on.

In another embodiment, the method comprises activating any confirm button having button visual identifiers that corresponds to an assigned element visual identifier of any activatable elements falling within a predetermined activation zone relative to the gaze area. In one form, the predetermined activation zone is configured to be of a size that captures the maximum number of activatable elements in the vicinity of the gaze area but without capturing activatable elements having the same element visual identifier.

In an embodiment, activating a confirm button for an activatable element comprises temporarily linking or assigning the confirm button to the activatable element such that actuation of the confirm button causes activation of the corresponding or linked activatable element, i.e. actuation of the activated confirm button results in the same outcome as if the activatable element had been clicked on by a mouse or subjected to a touch input (in the context of a touch screen display interface).

In an embodiment, sensing the user's gaze dwelling on an activated confirm button comprises sensing the user's gaze as being substantially stationary on a confirm button for a time interval corresponding to the second time threshold.

In an embodiment, the electronic visual work is a webpage, and the activatable elements at least comprise hyperlinks. In this embodiment, the method is performed in the context of a web browser, such that the gaze-controlled interface is a user input to the web browser to enable the user to interact with the displayed webpages.

Also described is a sixth aspect comprising a method of providing a gaze-controlled interface for a user to interact with activatable elements presented on an electronic display screen, comprising: providing a number of confirm buttons in the vicinity of the display screen at known fixed locations, each confirm button being distinguishable visually from the others; and dynamically activating the confirm buttons to be temporarily linked with an activatable element in the user's gaze based on a predetermined assignment configuration such that actuation of an activated confirm button causes activation of its temporarily linked activatable element.

Also described is a seventh aspect comprising a method of providing a gaze-controlled interface for a user to interact with activatable elements presented on an electronic display screen, comprising: providing a number of confirm buttons in the vicinity of the display screen at known fixed locations, each confirm button being distinguishable visually from the others; and dynamically activating the confirm buttons to be temporarily linked with an activatable element based at least partly on a predetermined assignment configuration such that actuation of an activated confirm button causes activation of its temporarily linked activatable element.

Also described is an eighth aspect comprising a method of linking a confirm button with an activatable element displayed on an electronic display screen in a multiple confirm button gaze-controlled interface, comprising: modifying displayed activatable elements to have a visual appearance that corresponds to the visual appearance of one of multiple confirm buttons provided in fixed locations on or relative to the display screen; and activating a confirm button to temporarily link with an activatable element in the user's gaze on the display screen, wherein the confirm button having a corresponding visual appearance to the activatable element being gazed on is activated.

Also described is a ninth aspect comprising a method of linking a confirm button with an activatable element displayed on an electronic display screen in a multiple confirm button gaze-controlled interface, comprising: modifying displayed activatable elements to have a visual appearance that corresponds to the visual appearance of one of multiple confirm buttons provided in fixed locations on or relative to the display screen; and activating a confirm button to temporarily link with an activatable element on the display screen that has a corresponding visual appearance to the confirm button based at least partly on gaze data representing the current or previous user's gaze, such that actuation of the confirm button causes activation of the temporarily linked activatable element.

Also described is a tenth aspect comprising a method of providing a gaze-controlled interface for a user to interact with an electronic visual work presented on an electronic display screen, comprising: providing a number of confirm buttons in the vicinity of the display screen at known fixed locations, each confirm button having a different fixed respective button visual identifier; processing the electronic visual work to identify activatable elements of at least one type; assigning an element visual identifier to each of the identified activatable elements, each element visual identifier corresponding to one of the button visual identifiers; modifying the display of the electronic visual work to present the assigned element visual identifiers for at least a portion of the displayed activatable elements; receiving a gaze signal representing the user's gaze position on the display screen from an eye gaze tracker; sensing the user's gaze dwelling on or near an activatable element of the displayed electronic display screen based on the gaze signal; activating the confirm button having the button visual identifier corresponding to the element visual identifier assigned to the dwelled-on activatable element such that actuation of the activated confirm button causes activation of the dwelled-on activatable element; sensing actuation of the activated confirm button in response to the user's gaze dwelling on the activated confirm button based on the gaze signal; and activating the activatable element in response to the sensed actuation of the activated confirm button.

Also described is an eleventh aspect comprising a gaze-controlled interface system for enabling a user to interact with an electronic visual work presented on an electronic display screen, comprising: an electronic display screen configured to present the electronic visual work; an eye gaze tracker configured to sense the user's gaze position on the display screen and generate representative gaze signal; a processor operatively connected to the display screen and eye gaze tracker, and which is programmed to execute the methods of any one of the previous aspects.

Also described is a twelfth aspect comprising a hardware system or a processor that is configured to execute the methods of any one of the previous aspects.

Also described is a thirteenth aspect comprising a non-transitory computer-readable medium having stored thereon computer executable instructions that, when executed on a processing device, cause the processing device to perform any one of the methods of the previous aspects.

The fifth-thirteenth aspects may have any one or more features mentioned in respect of the first-fourth aspects.

The phrase "confirm button" as used in the specification and claims is intended to mean, unless the context suggests otherwise, electronically generated graphical buttons represented on an electronic display screen or physical button manifestations primarily in two dimensional form, such as printed button markers or targets or indicia, whether permanently applied or temporarily applied such as in the form of stickers, or other physical formations representing buttons, including those being embossed or protruding in a third dimension relative to surrounding surface upon which they are provided, and the buttons representing eye gaze targets or target locations as opposed to tactually operated buttons.

The phrase "activatable elements" or term "activatables" as used in this specification and claims interchangeably are intended to mean, unless the context suggests otherwise, any form of activatable, actionable, or interactive element or object in electronic visual work or graphical user interface (GUI) that would ordinarily be clickable, selectable, or actionable or in any other way activated with a conventional electronic input interface such as a keyboard, mouse pointer or touch input on a touch screen display, and for example includes electronic visual works in the form of webpages containing activatable elements in the form of textural or imagery hyperlinks, buttons, or selectable fields, or in the context of electronic visual works in the form of graphical user interfaces (GUI) for controlling an application program the activatable elements may include operable graphical icons, widgets, areas, menus, buttons, fields, other user interface elements, or the like, and where the terms 'clicking', 'selecting' or 'actuating' are examples used synonymously to indicate some way of performing an action on an activatable element.

The phrase "electronic visual work" as used in this specification and claims is intended to mean, unless the context suggests otherwise, any form of electronic visual display work presented or presentable on an electronic display screen including electronic media content such as webpages, word processing documents, interactive media documents rendered by web browsers, word processing applications or other document applications, or alternatively electronic visual works in the form of graphical user interfaces (GUIs) associated with user interaction or operation or control of application programs or software.

The term "margin" as used in this specification and claims is intended to mean, unless the context suggests otherwise, either an area on a display screen outside or about a periphery of the content of an electronic visual work presented such that the margin can be considered as being either a dynamically altering portion or portions of the operable display screen area depending on how the electronic work is displayed, or an area outside or about the periphery of the operable region of the display screen such that the margin can be considered to be a dedicated portion or portions of the housing, frame or body that surround or border the operable region of the display screen, whether it is a standalone device or a component or part of an electronic device.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

Number Ranges

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "and/or" means "and" or "or", or both.

As used herein "(s)" following a noun means the plural and/or singular forms of the noun.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

Figure 1:
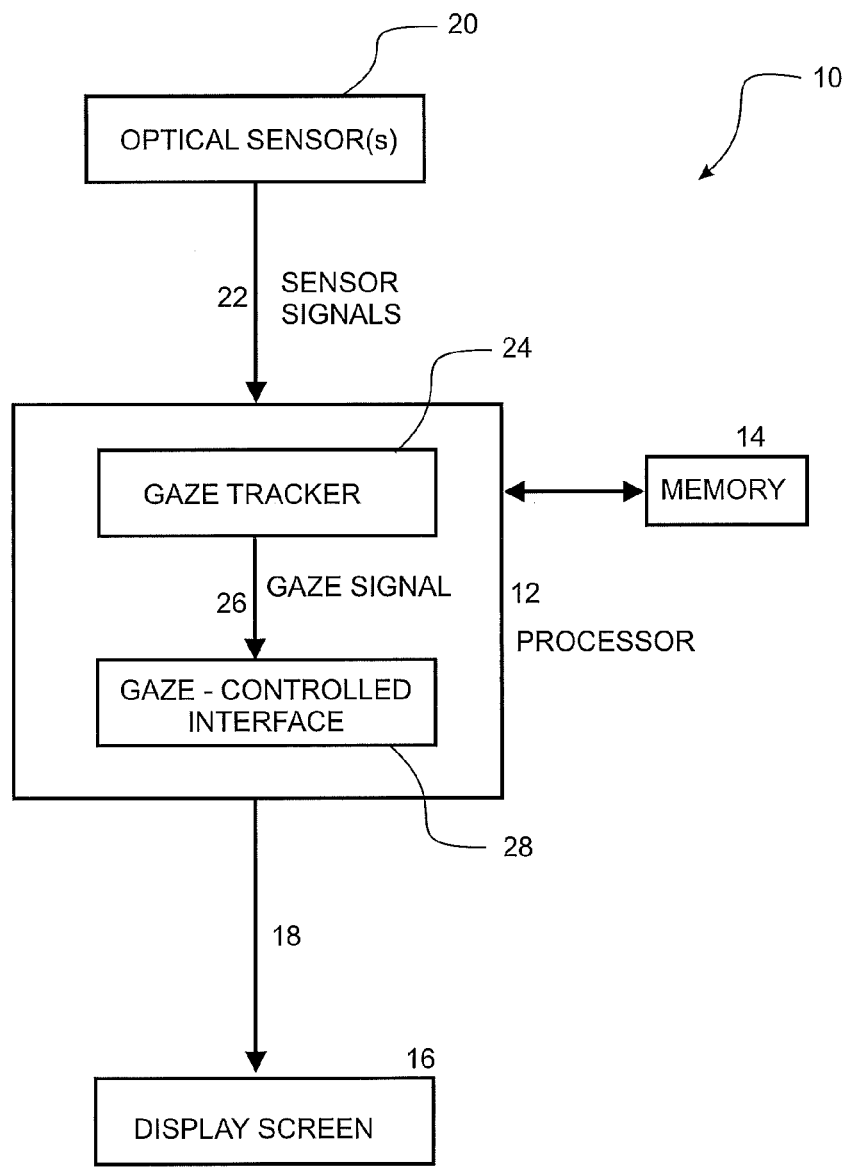
FIG. 1 is a schematic diagram of the typical hardware components and configuration of a system implementing the gaze-controlled interface in accordance with an embodiment of the invention.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program or hardware. When a process corresponds to a function, its termination corresponds to a return of the function to the calling function or a main function.

Aspects of the systems and methods described below may be operable on any type of general purpose computer system or computing device, including, but not limited to, a desktop, laptop, notebook, tablet or mobile device. The term "mobile device" includes, but is not limited to, a wireless device, a smartphone, a mobile phone, a mobile communication device, a user communication device, personal digital assistant, mobile hand-held computer, a laptop computer, wearable computers (including glasses), an electronic book reader and reading devices capable of reading electronic contents and/or other types of mobile devices typically carried by individuals.

1. Overview

This invention relates to a gaze-controlled interface method and system to enable a user to interact with an electronic visual work such as, but not limited to, a webpage or graphical user interface presented on an electronic display screen by a computing or processing device. The gaze-controlled interface method is based on dwell and multiple static confirm buttons provided in predetermined fixed locations. As will be explained further, the multiple confirm buttons are distinguishable from each other visually via respective button visual identifiers, such as colours and/or patterns and/or shapes.

In operation, the gaze-controlled interface method analyses the electronic visual work display screen for activatable elements of a particular type or many types, and then assigns an element visual identifier to each activatable element (e.g. a hyperlink in the context of a webpage, button, field or any other clickable or interactive item or object) which corresponds to one of the button visual identifiers. After this assignment, the electronic visual work is modified or masked with an overlay which presents or applies the assigned element visual identifiers to their respective activatable element. The element visual identifiers may be revealed or presented progressively and dynamically for portions of the display screen where the user is gazing. Alternatively, the assigned element visual identifiers may be presented or revealed for all activatable elements captured on the display screen. With this assignment process, each activatable element has an assigned element visual identifier that may be associated or linked visually with one of the multiple confirm buttons via colour association, pattern association, and/or shape association. For example, hyperlinks assigned red would be activatable by the red confirm button, hyperlinks assigned blue would be activatable by the blue confirm button, hyperlinks assigned green would be activatable by the green confirm button, and so on, in the context of a colour-based visual association.

The confirm buttons are initially inactive or non-live such that actuation by a dwelling on the confirm button results in no action, as the confirm buttons are not linked to any specific individual activatable element. The gaze-controlled interface method is configured to dynamically activate or assign the confirm buttons to one of their associated activatable elements based on where the user is gazing in the electronic visual work in one embodiment or alternatively based on where the used has been gazing in the electronic visual work in a second embodiment.

By way of example, in the first embodiment, if the user is dwelling, i.e. gaze is substantially stationary, in the particular gaze area of the electronic visual work, the interface algorithm activates the confirm button corresponding to at least the closest activatable element in the gaze area and typically also other confirm buttons associated with any other close activatable elements in or near the gaze area. Activation of a confirm button means that it is temporarily associated or linked with an activatable element having an element visual identifier that corresponds to its button visual identifier. If the user then dwells on an activated confirm button, the interface algorithm actuates the associated activatable element, i.e. this is equivalent to a touch input or mouse click on the activatable element. If the user's gaze does not actuate any of the activated confirm buttons, but traverses or gazes on a new area of activatable elements, the confirm buttons are dynamically deactivated and/or reactivated to any new activatable elements being dwelled upon. This 'activation threshold' embodiment will be explained further later.

By way of example, in the second embodiment, the interface algorithm is configured to record or store gaze data representing the user's gaze based on a gaze signal as the user dwells near activatables in the electronic visual work. If at any time the user then dwells on a confirm button, the interface algorithm is configured to analyse the recorded gaze data to find the activatable element(s) that the user most likely intends to actuate. If an activatable element is identified that the user likely intends to actuate, based on the recorded gaze data and the dwelled-on confirm button, this activatable element is actuated. In particular, the dwelled-on confirm button is activated, i.e. temporarily associated or linked with the identified activatable element, and the associated identified activatable element is actuated. Essentially, in this second embodiment, the steps of activation of a confirm button and actuation of the confirm button occur together or can be considered as a single step. This 'a posteriori analysis' embodiment will be explained further later.

In either embodiment, as the confirm buttons are static and fixed in location, they are not distracting in the user's peripheral vision, and familiarity of their static location increases with frequency of use such that the speed of the confirmation step increases with frequency of use. Additionally, as the confirm buttons are outside the display screen of the visual work, i.e. in a separate window margin as graphical confirm buttons, or alternatively physical confirm buttons provided on the casing or housing surrounding the operable region or area of electronic display, they do not occlude screen content. Also, as the confirm buttons are associated with activatable elements visually via colour, pattern, and/or shape association, quick correspondence can be made by the user during the confirmation and/or actuation steps when dwelling on the desired confirm button. Also, since the position of each colour, pattern, and/or shape of confirm button does not change, it improves the speed of confirmation and/or actuation steps further, with frequent use. With this configuration, activatables stay assigned to the same confirm buttons, which makes the interface more predictable and usable for subsequent confirm button activations and/or actuations for an activatable.

Additionally, with the first embodiment, the algorithm may activate multiple confirm buttons at once and this compensates for any lack of accuracy and precision for tight clusters of activatable elements without requiring any visual magnification of the screen content.

2. System Configuration

The gaze-controlled interface method may be implemented on any hardware system having an integrated or associated electronic display, whether a desktop computer, or portable device such as a tablet or smartphone or similar. Referring to FIG. 1, a typical hardware system or device 10 comprises a processor 12 and associated memory 14 which execute the gaze-controlled interface algorithm. The hardware system 10 comprises an eye or gaze tracker system which is configured to sense the user's eye gaze position on the display screen 16 which is controlled by the processor 12 to present the electronic visual work via display signals 18. Typically, the gaze tracker system is non-invasive and comprises one or more optical sensors 20, such as infrared cameras, which are configured to view the user's eyes which are facing the display screen 16. It will be appreciated that the optical sensor or sensors 20 may be integrated with the hardware device, such as integrated with the display screen like integrated webcams about the periphery or frame of the display screen, or alternatively may be separate optical sensors situated in a location which can view the user's eyes and which are connected to a hardware device or system, whether hardwired or wirelessly. The optical sensors generate sensor signals 22 that are processed by a gaze tracker algorithm or software 24 running on the processor which can determine the user's gaze direction using, for example, the pupil-centre-corneal-reflection (PCCR) method, or any other suitable eye tracking algorithm or image processing for eye or gaze tracking which are known to a skilled person. The gaze tracker 24 generates a gaze signal or signals 26 representing the user's gaze position on or relative to the display screen. For example, the gaze signal may be pixel coordinates or gaze direction or the like. The gaze signal 26 is continuously received and processed by the gaze-controlled interface algorithm 28. As will be explained further, the gaze-controlled interface processes electronic visual work presented on the display screen 16 by the processor and enables user interaction with the electronic visual work based on processing of the gaze signal(s) 26 from the gaze tracker 24.

In some embodiments, the gaze-controlled interface may further comprise a gaze tracker auto-calibration algorithm that is configured to automatically calibrate the gaze tracker 24 using one or more visual features of the interface. By way of example, the visual features may comprise any one or more of the confirm buttons and their anchor points or co-ordinate or activatable elements of the electronic visual work. For example, if the reported gaze point associated with dwelling on confirm buttons, as represented by the gaze signal(s), is consistently offset from the anchor points or co-ordinates of the confirm buttons being dwelled upon, the interface algorithm can dynamically correct or improve the calibration of the gaze tracker 24.

3. Gaze-Controlled Web Browser

By way of example only, the gaze-controlled interface method and system will be described in the context of its implementation for a gaze-controlled web browser. In particular, the gaze-controlled interface method will be explained with reference to a user navigating and interacting with an electronic visual work in the form of a webpage rendered via a web browser. However, it will be appreciated that the gaze-controlled interface algorithm may be implemented for any other form of interactive electronic visual works having activatable elements with which a user may interact, including electronic visual works rendered by application program or GUIs or control elements such as menus and/or buttons of GUIs of application programs. It will be appreciated by a skilled person how the algorithms of the interface may be adapted for different types of electronic visual works.

Main Gaze-Controlled Interface Algorithm

Figure 2A:
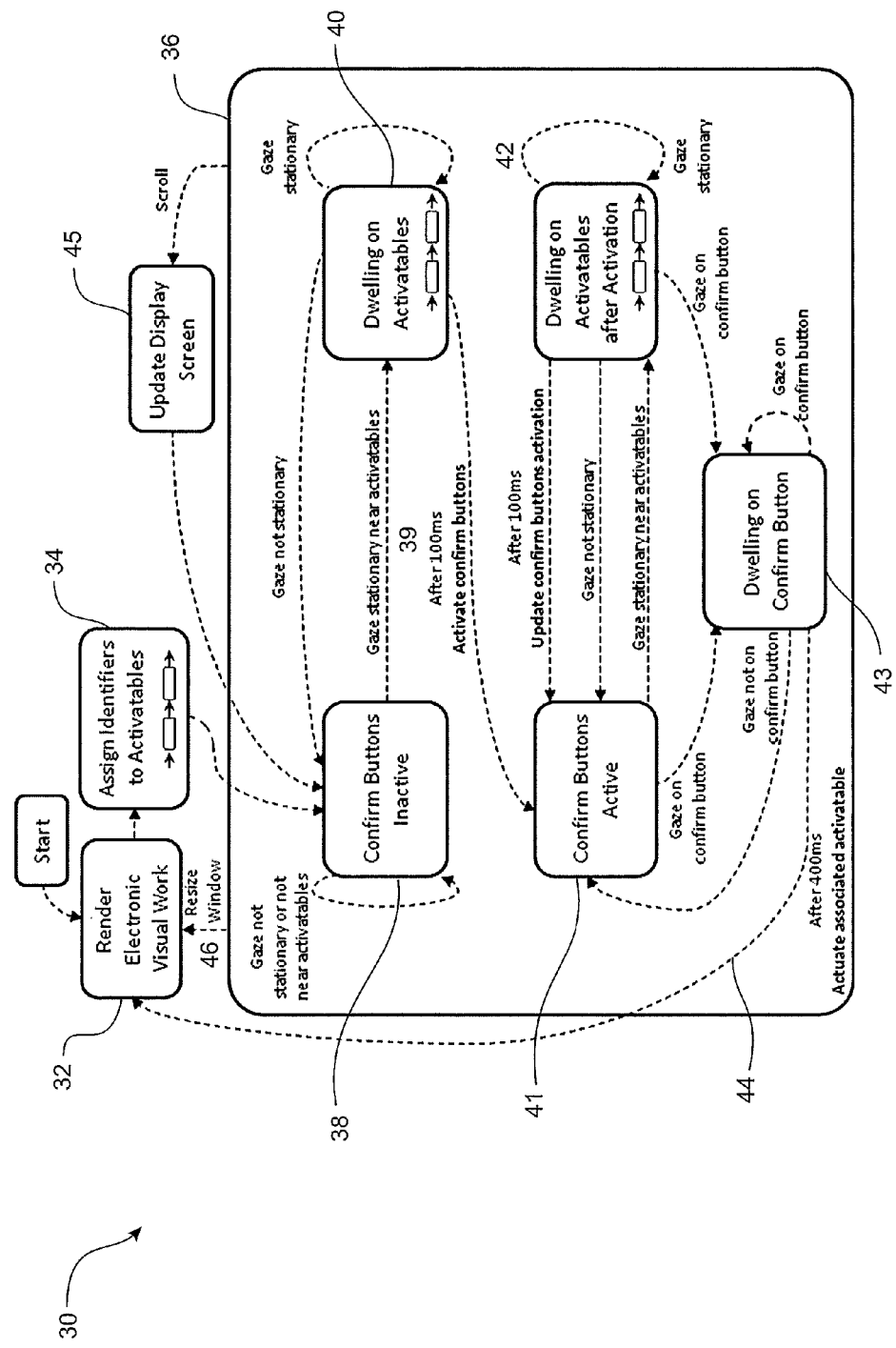
FIG. 2A is a state diagram of the gaze-controlled interface method in accordance with a first embodiment of the invention implemented using an 'activation threshold' algorithm.
Figure 2B:
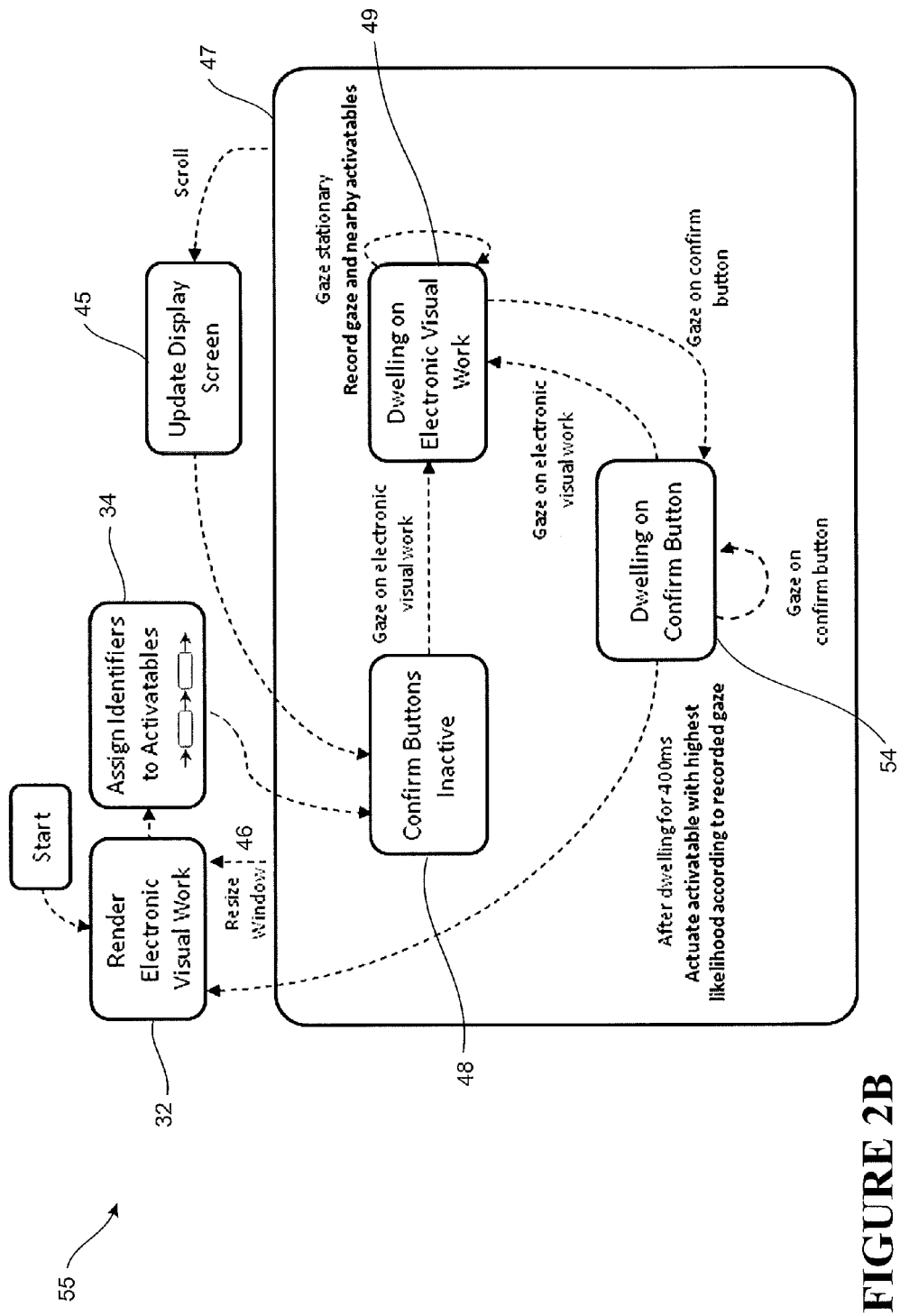
FIG. 2B is a state diagram of the gaze-controlled interface method in accordance with a second embodiment of the invention implemented using an 'a posteriori analysis' algorithm.

FIGS. 2A and 2B show two embodiments of the main gaze-controlled interface algorithm 30 and 47. Like reference numerals refer to like steps. Firstly, the interface is configured to load the electronic visual work, which in the context of a web browser example may be a webpage, and render it on the display screen of the hardware device, as shown at 32. Upon loading the electronic visual work, the gaze interface algorithm is configured to process and analyse the data file of the electronic visual work, such as HTML or similar in the context of the webpage example, to identify any activatable elements with which a user may interact in an assignment stage 34. The activatable elements may be any conventional mouse-clickable or touch input interactive elements, such as hyperlinks, fields, buttons or similar in the context of the webpage example. The assignment stage 34 may be configured to identify one or multiple types of activatable elements depending on the level of gaze-control required. For example, all activatable elements of all types may be identified in one example for full user interaction via gaze-control or alternatively activatable elements of only a single type may be identified for a more limited or partial gaze-controlled interaction with an electronic visual work.

Once the desired type or types of activatable elements have been identified in the electronic visual work, the assignment stage 34 assigns an element visual identifier to each of the identified activatable elements. Each element visual identifier is selected from one of a predetermined fixed number of identifiers, each of which corresponds visually or has a visual association with a button visual identifier of one of the multiple confirm buttons.

Confirm Buttons

Figure 6:
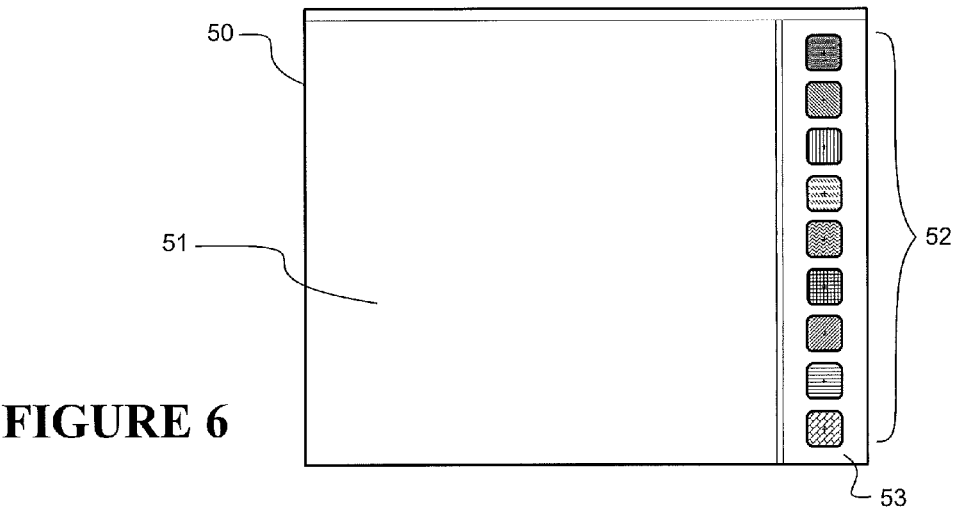
FIG. 6 is a schematic representation of an electronic display screen of a desktop computer, and showing electronically generated graphical confirm buttons in a right-hand margin of the display screen.

As previously described, the embodiments of the gaze interface algorithm is based on dwell in combination with confirmation-step or actuation buttons ('confirm buttons'). The interface uses multiple confirm buttons of a predetermined number that are displayed statically in the vicinity of the display screen at known fixed locations, such as in a margin relative to the displayed electronic visual work for example. FIG. 6 shows an example of a display screen 50 having a main display window 51 within which the electronic visual work, such as a webpage in this example, will be displayed in the web browser, and a separate gaze-control window 53 extending in the right-hand margin of the display screen 50. In the gaze-control window 53, multiple confirm buttons 52 are provided, each having a distinct button visual identifier. In this example, the button visual identifiers are shown as distinct different patterns, but could alternatively be different colours, patterns, shapes or a combination of colour, pattern and/or shape.

Figure 8:
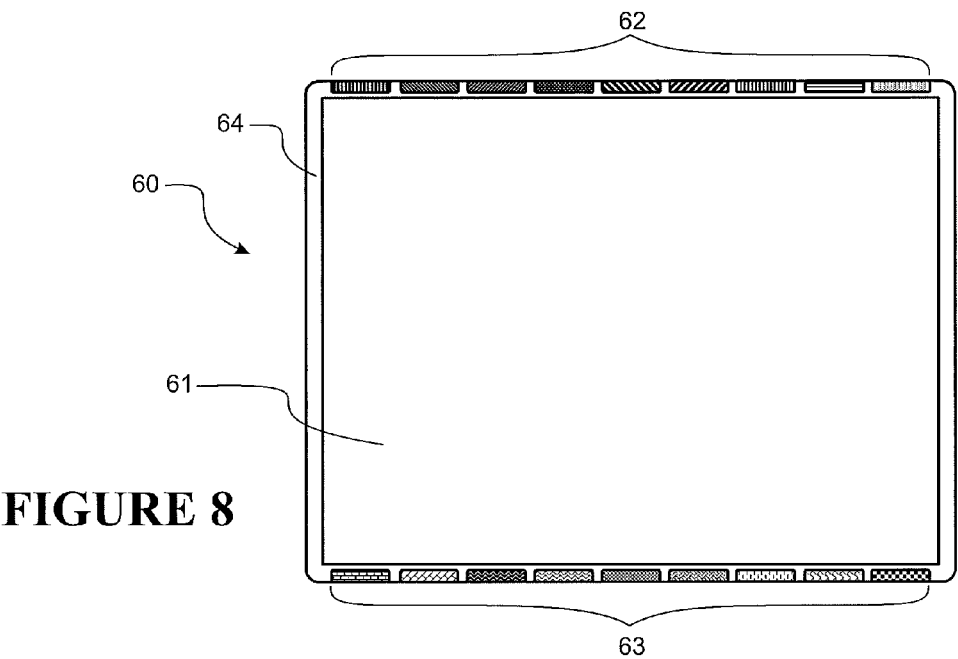
FIG. 8 shows a schematic representation of a tablet computer implementing the gaze-controlled interface using physical confirm button representations provided on portions of the housing or casing surrounding the electronic display screen.
Figure 9:
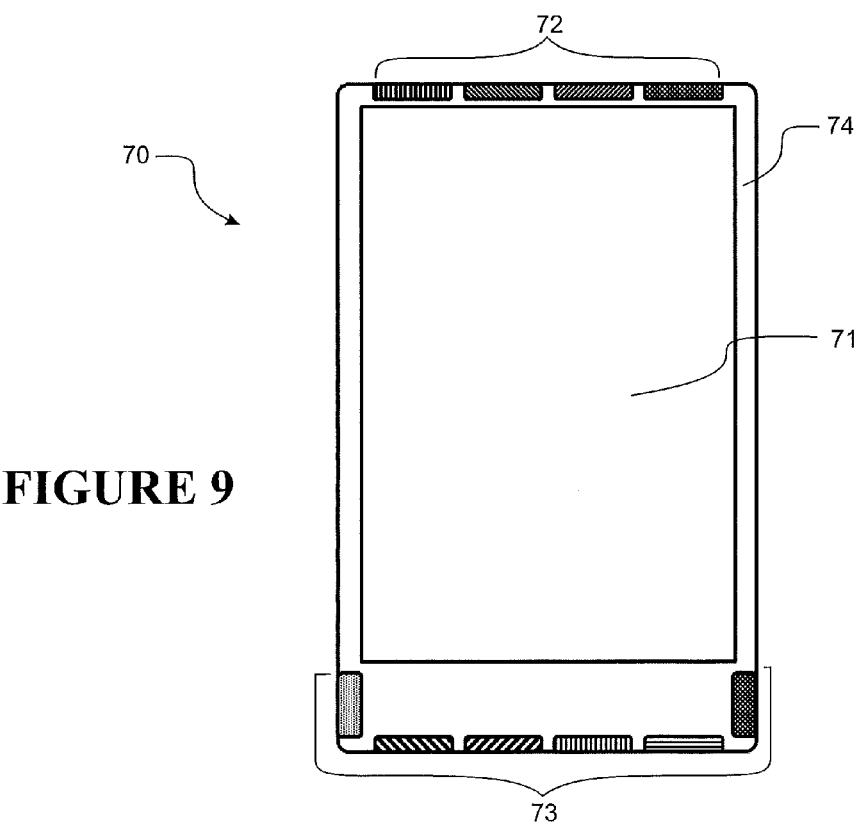
FIG. 9 shows a schematic representation of a smartphone implementing the gaze-controlled interface using physical control button representations provided on portions of the housing or casing surrounding the electronic display screen.

In this form, the confirm buttons 52 are electronically generated graphical confirm buttons generated by the gaze-controlled interface algorithm. However, in other forms, the confirm buttons used by the gaze-controlled interface algorithm may be physical confirm buttons provided about at least a portion of the casing and housing bordering the operable display screen area. For example, FIG. 8 shows a hardware device in the form of a tablet 60 having a touch screen display 61. As shown, an upper set of confirm buttons 62 are provided on the upper frame of the casing 64 of the tablet and a lower set 63 of confirm buttons are provided on the lower frame of the casing. These sets of confirm buttons 62, 63 are again provided with distinguishing button visual identifiers and may be either printed (laser or otherwise), stickers, or otherwise formed or provided on the casing, such as being provided on a retrofit frame or control panel being retrofittable to the casing or display screen. The physical confirm buttons 62, 63 may be flat or flush with the casing or slightly embossed or have a three dimensional aspect. In another example, FIG. 9 shows a smartphone device 70 having a touch screen display 71 and an upper set of confirm buttons 72 and lower set of confirm buttons 73 provided on the casing or housing 74 surrounding the display screen.

In either of the above embodiments, whether electronically generated graphical confirm buttons or physical confirm buttons, the pixel locations and/or area covered by the confirm buttons is fixed and known to the interface algorithm. In the context of the graphical confirm buttons, their onscreen pixel locations are known, and in the context of the physical buttons their 'virtual' pixel location relative to the display screen are known. For example, in this context the frame or casing surrounding the display screen may be considered as an extension of the operable display screen such that the physical buttons have a virtual pixel location as if they were presented on the display screen graphically. The gaze tracker system can sense the user's gaze position on the casing or frame surrounding the electronic display screen also.

The number of confirm buttons used may be varied depending on the intended use of the interface algorithm. For electronically generated graphical confirm buttons, the interface algorithm at the start may configure the number of confirm buttons presented depending on various factors, including the density and/or number of activatable elements in the electronic visual work, and/or the available screen real-estate. There is a balance between too many and not enough confirm buttons. For physically provided confirm buttons, the number may be dictated or restricted by the size of the surface area on the casing surrounding the display screen. Too many confirm buttons can make quick visual association difficult, and not enough can make it difficult for the algorithm to enable the user to interact accurately with documents having close clusters of activatables.

The presentation of the confirm buttons may also be varied depending on the intended use of the interface algorithm. The buttons may be presented in vertical or horizontal line-arrays, 2D-arrays, or random locations.

Assignment of Element Visual Identifiers

Reverting to FIGS. 2A and 2B, the assignment stage 34 of the element visual identifiers is such that the on-screen distance between activatable elements having the same element visual identifier is maximised. In particular, as there are only a predefined fixed number of element visual identifiers corresponding to the fixed number of confirm buttons, multiple activatable elements in an electronic visual work may have been assigned the same element visual identifier. For example an electronic visual work may comprise a large number of activatable elements, and the predefined number of element visual identifiers available are assigned such that distance between activatable elements having the same or similar visual identifiers is maximised. In some embodiments, additional or alternative criteria, such as maximizing the distance between the confirm buttons corresponding to neighbouring activatables, may also be employed to reduce chances of inadvertent clicks.

In the following examples, the element visual identifiers are colour-based and each colour corresponds to a colour representing a button visual identifier of one of the confirm buttons, but the same principles may apply to element and button visual identifiers corresponding to patterns and/or shapes. Examples of possible visual identifier assignment sub-algorithms will be explained with reference to FIGS. 3 and 4. The example sub-algorithms will be explained in the context of activatables that are hyperlinks in a webpage, but it will be appreciated that the algorithms can be applied to any one or more types of activatables in any electronic visual work.

Figure 3:
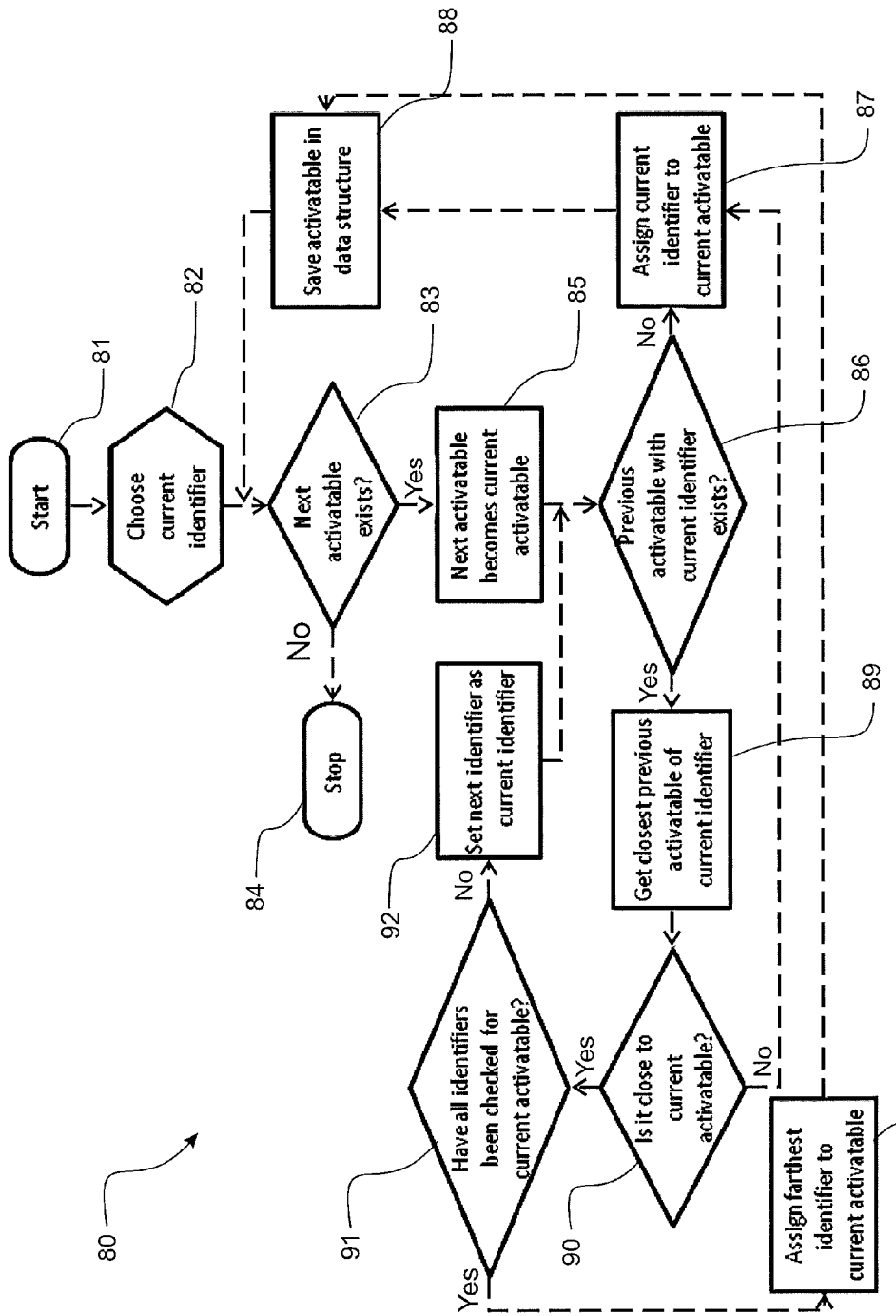
FIG. 3 is a flow diagram of a first form of visual identifier assignment sub-algorithm of the gaze-controlled interface method for use in the embodiments of FIGS. 2A and 2B.

Referring to FIG. 3, a first example of a visual identifier assignment sub-algorithm 80 is shown for processing the electronic visual work. After commencing 81, the visual identifier assignment sub-algorithm 80 sets the current visual identifier, selected arbitrarily from the predefined set of available identifier, e.g. colours in this example. For example, if there are four confirm buttons, being coloured red, green, blue and orange, then there are four element visual identifiers, corresponding to red, green, blue and orange. The sub-algorithm 80 reviews the electronic visual work to determine if an activatable element (e.g. hyperlink in this example) exists at decision 83. If no further activatables (e.g. hyperlinks) exist, the algorithm stops 84.

If another activatable is identified at decision 83, then the next activatable is set as current activatable at step 85. The selection of the next activatable at 85 can be based on the next closest unassigned activatable to the previous processed activatable or based on any other given order or pattern to progressively select the next unassigned activatable. A decision 86 is then made about whether any previous activatables have been assigned the same selected current visual identifier 82 (e.g. colour in this example). If the selected current visual identifier 82 has not previously been assigned to another activatable, then the selected visual identifier 82 is assigned to the current activatable at step 87 and the assignment of this element visual identifier to the activatable element is stored in a data structure or data file 88 or memory. After this, the algorithm returns to the decision 83 to determine whether any more activatables (e.g. hyperlinks in this example) exist in the electronic work that require the assignment of an element visual identifier.

If a previous activatable has been assigned the selected current visual identifier 82, then the closest previous activatable of current visual identifier is retrieved 89. Then a decision 90 is made about whether the retrieved activatable is close to the current activatable (i.e. how close is the retrieved hyperlink to the current hyperlink in this example). For example, if the pixel coordinates of the previously assigned activatable and the current activatable are within a predefined zone, for example a pixel radius relative to each other, then the previously assigned activatable and the current activatable are considered to be close. If it is close, then a decision 91 is made on whether all visual identifiers (e.g. all colours in this example) have been checked for current activatable. If all visual identifiers have been checked, then the farthest visual identifier from current activatable is assigned to current activatable 93. This is then stored in the data structure or data file or memory 88. In contrast, if all visual identifiers have not been checked 91, then the next visual identifier that has not been checked yet is selected as the current visual identifier 82 and the algorithm returns to decision 86 as before. If the earlier activatable 89 of current visual identifier 82 (or reselected identifier 92) is not close to the current activatable 85, as checked in decision 90, then the current visual identifier 82 (or reselected identifier 92) is assigned to the current activatable 85 and stored in the data structure or file or memory 88.

With the above visual identifier assignment sub-algorithm 80, the assignment of an element visual identifier (e.g. colour in this example) to each of the activatable elements (e.g. hyperlinks in this example) is such that the distance on the display screen between the activatable elements having the same assigned visual identifier is maximised or is set such that the distance exceeds a predetermined distance threshold or assignment zone. In one form, determining whether the current activatable is close to a previously assigned activatable of the same visual identifier as the selected current identifier is determined by whether the pixel coordinates corresponding to the pixel locations of the respective activatables fall within a circular zone of predetermined pixel radius centred about the respective activatables.

Figure 4:
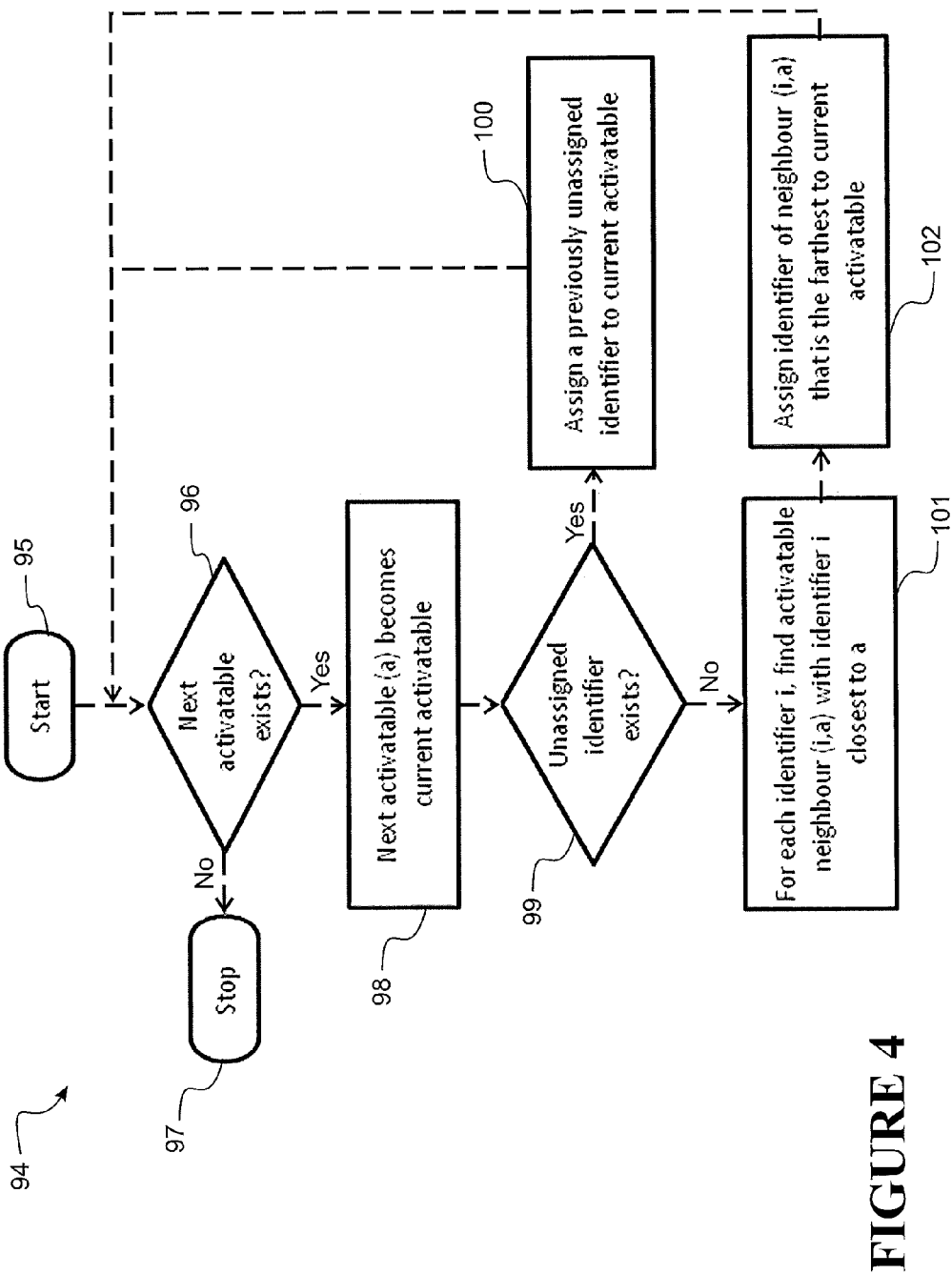
FIG. 4 is a second form of visual identifier assignment sub-algorithm for the gaze-controlled interface method for use in the embodiments of FIGS. 2A and 2B.

Referring to FIG. 4, a second example of a visual identifier assignment sub-algorithm 94 will be described for progressively assigning visual identifiers (e.g. colours in this example) to the activatables of an electronic visual work (e.g. hyperlinks within a webpage). In this algorithm 94, after commencing at 95, the electronic visual work is processed at decision 96 to determine whether another activatable element (e.g. hyperlink) exists. If no further activatables exist, the algorithm stops 97. If another activatable exists, the next unassigned activatable is selected as the current activatable at 98. At the selection step 98, the next unassigned activatable (a) selected can be based on the distance from the previously assigned activatable or any other given order or pattern to progressively select the next unassigned activatable. A decision 99 is then made about whether any visual identifier(s) in the set of available visual identifiers have been left unassigned. If one of the visual identifiers has not yet been assigned, then that visual identifier is assigned to the selected activatable a at step 100, and then the algorithm returns to check the electronic visual work for any further unassigned activatables that require an assigned visual identifier at step 96.

However, at decision 99, if all visual identifiers (e.g. all colours in this example) in the predefined set have already been assigned, analysis is done to gather a neighbour set of activatables at step 101. In particular, for each visual identifier (i) in the predefined set the activatable neighbour (i,a) with visual identifier i closest to the current activatable a is located and stored in the neighbour set. The farthest activatable neighbour in the neighbour set from the unassigned current activatable a is then identified at step 102 and the visual identifier of that farthest activatable neighbour is assigned to the unassigned current activatable a, before the algorithm returns to decision 96 to assign visual identifiers to the next unassigned activatables, if any.

As with the first example visual identifier assignment sub-algorithm, the visual identifier assignment for the links is stored in a data file or memory.

Modification of Electronic Visual Work after Visual Identifier Assignment

After the visual identifier assignment stage 34, the electronic visual work (e.g. webpage in this example) is modified to present the activatables (e.g. hyperlinks in this example) with their assigned element visual identifiers (in this example an assigned colour corresponding to one of the coloured confirm buttons) based on the assignment data file. The user may be presented with a display screen in which the activatables (e.g. hyperlinks in this example) are all coloured, highlighted, underlined or otherwise have an associated visual identifier (e.g. colour in this example) that corresponds to their assigned visual identifier (e.g. their assigned colour). In one form, the visual identifier assignment may be presented to the user progressively or dynamically as they gaze on the different areas of the screen. In an alternative form, all activatables on screen may have their assigned visual identifier presented at any one time. In this form, the algorithm may be further configured to identify the activatable element(s) near the user's gaze using additional underlines, border highlighting, or any other supplementary visual indicator as user feedback on their tracked gaze.

In one form, the visual identifier assignment may be presented to the user via a masking overlay window or screen which overlays the conventional display of the electronic visual work to highlight the activatables with their assigned visual identifiers. In another form, the gaze-controlled interface may modify the code or file of the electronic visual work, such as an HTML file in the context of this webpage example, such that the display screen renders the links with their assigned visual identifiers without requiring a separate screen overlay.

First Embodiment—Confirm Button Activation and Actuation

Reverting to FIG. 2A, after the element visual identifier assignment stage 34 and modification of the presentation of the electronic visual work (e.g. webpage in this example) to present or render the activatables (e.g. hyperlinks in this example) with their assigned visual identifiers (e.g. colours in this example), the main gaze-controlled interface algorithm 36 begins. In this first embodiment, the main gaze-controlled interface algorithm 36 is an 'activation threshold' algorithm. Initially, all the confirm buttons are in an inactive state 38 when the user's gaze is not stationary or not near any activatable. When in an inactive state, the confirm buttons do not trigger or perform any action when dwelled on by the user.

If the user's gaze is sensed as being substantially stationary near activatables 39 the algorithm jumps to state 40 which corresponds to the user dwelling on or near activatables. If the user is sensed as gazing in a gaze area on or near activatables for a time interval corresponding to a first time threshold, then one or more of the confirm buttons are activated. The sub algorithm for detecting whether the user is dwelling on activatables and whether the confirm button (s) should be activated, is shown in FIG. 5.

Figure 5:
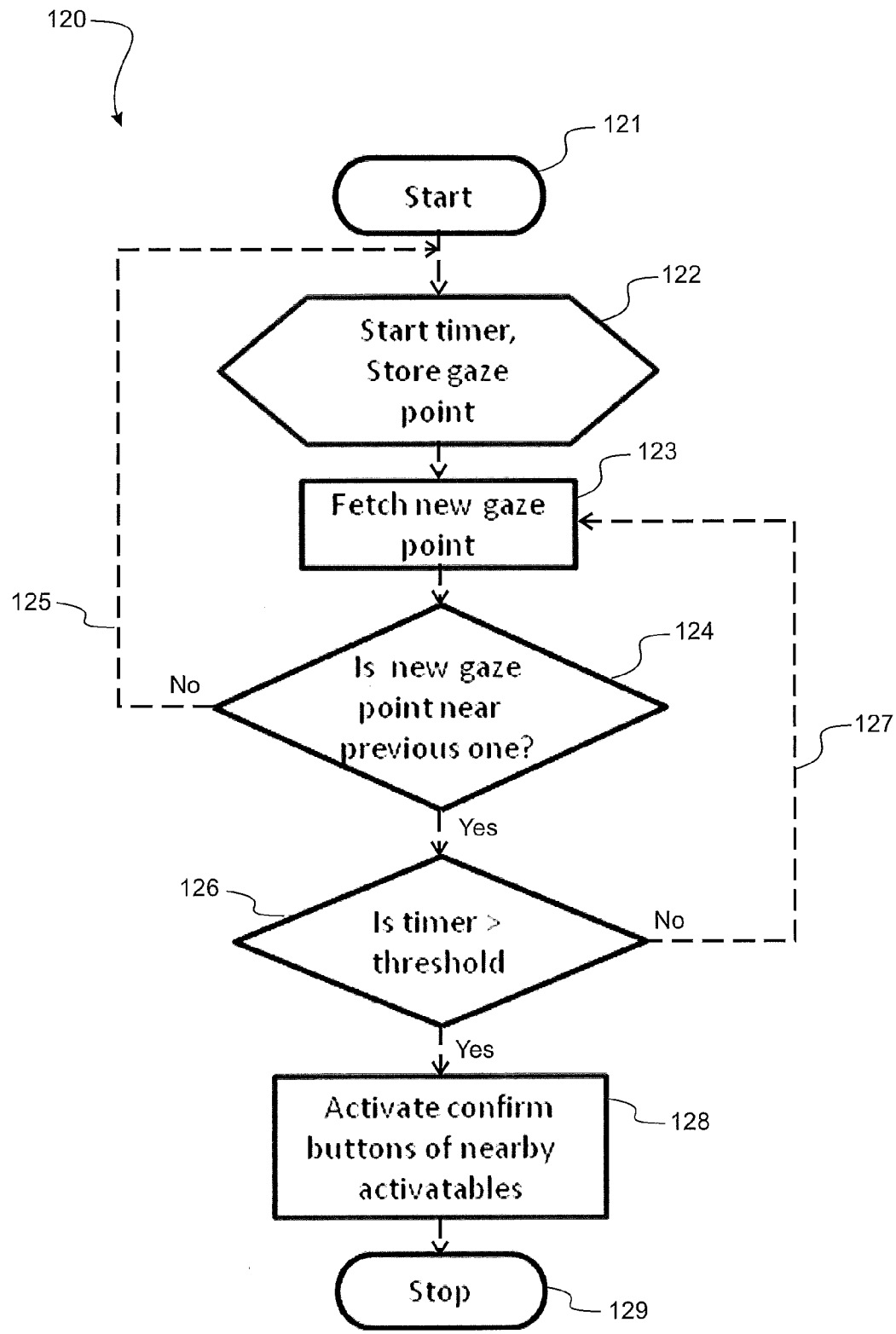
FIG. 5 is a flow diagram of an activatable dwelling sub-algorithm of the gaze-controlled interface method for use in the embodiments of FIGS. 2A and 2B.

The activatable dwelling sub-algorithm 120 in FIG. 5 determines whether the user's gaze is substantially stationary for a time interval corresponding to the first time threshold. After commencing at step 121 after entering the activatable dwelling state 40, a timer is started and the gaze position determined by the gaze signal from the eye tracker is stored 122. The next gaze position sample is then fetched 123 and analysed at decision 124 as to whether it is near or close to the previous gaze sample. If it is not 125, the algorithm returns to state 122 and restarts the timer. In one example implementation, gaze point samples are considered to be near each other if they are within a predetermined distance defined by a predetermined distance threshold or parameter. In this example, the successive gaze position samples are considered to be near each other if one of the sample positions falls within a circular gaze area of predetermined radius centred about the gaze position samples, for example the radius may be 30 pixels but this could be varied depending on the accuracy of the eye tracker in other embodiments. If the successive gaze sample positions are considered to be near each other, then the timer is compared to the timer threshold at step 126. If the threshold is not exceeded, then the algorithm returns to step 123 for the next gaze point sample as shown at 127. However, if the timer exceeds the first threshold, then the gaze is considered to be stationary in the gaze area and the sub-algorithm moves to step 128 at which point activation of the confirm buttons is required. In this embodiment, the first time threshold is 100 ms, but it will be appreciated this may be varied or adjusted as required in other embodiments.

In one embodiment, the main interface algorithm 36 may be considered to activate only the confirm button corresponding to the activatable near the last gaze sample or alternatively all activatables falling within a predetermined activation zone relative to the last gaze sample may have their confirm buttons activated. In such embodiments, the predetermined activation zone may be configured to be smaller than the assignment zone used in the assignment step, such that the activation is not likely to capture two activatables having the same assigned colour. However, if two or more activatables having the same assigned colour do happen to fall within the activation zone, then the activatable closest to the last gaze position sample is selected to be associated with its corresponding activated confirm button. In some embodiments, the algorithm can be configured to visually indicate activation of the confirm buttons associated with activatable elements near the user gaze, for example falling within the activation zone, by dynamically displaying underlines or border highlighting or any other supplementary visual indicator to the activatable elements when their associated confirm button is activated. The activatable dwelling sub-algorithm then ceases at step 129.

Figure 7:
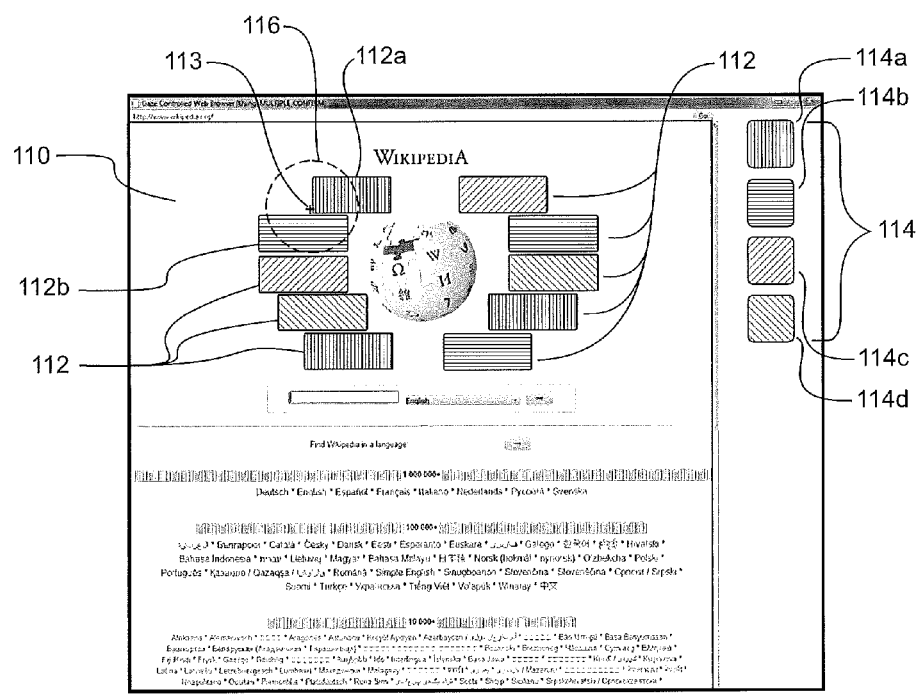
FIG. 7 shows an example of the desktop computer implementation of FIG. 6 rendering a webpage.

By way of example, referring to FIG. 7, an example webpage 110 is shown with a number of hyperlinks 112, which in this example are delineated by borders for clarity of the explanation. In this example the last gaze position sample is shown at pixel 113 and the activation zone shown by the dotted border 116 centred about the last gaze position 113. In this example, links 112a and 112b fall within the activation zone. The confirm buttons 114 are shown graphically in the gaze control window in predetermined fixed locations, and in this example the element (hyperlinks) and button visual identifiers are depicted as patterns not colours, for clarity of explanation. As shown, the element visual identifiers of activatable elements 112a, 112b correspond to the button visual identifiers of buttons 114a and 114b, and therefore these confirm buttons are activated while the lower confirm buttons 114c and 114d remain inactive. Activation of the confirm buttons 114a, 114b means that any dwelling upon these confirm buttons by the user's gaze will be considered to be actuation of the button and cause activation of the temporarily associated activatable element 112a, 112b respectively, as explained further below.

Reverting again to FIG. 2A, after activation of the one or more confirm buttons, the main interface algorithm 36 moves to the activated confirm buttons state 41. In the confirm buttons activated state 41, the gaze signal is analysed to determine whether the user's gaze is stationary on the same activatable or any new activatable, or whether the gaze is stationary on any of the confirm buttons.

If the gaze is detected as being stationary and dwelling on new activatables, then the activatable dwelling sub-algorithm 120 previously described with reference to FIG. 5 is applied at state 42. If any new activatables are dwelled on in a new or modified gaze area for a time interval corresponding to the predetermined time threshold (e.g. 100 ms), then the confirm button activation is updated such that the required confirm buttons are activated or reactivated for any such newly dwelled-on activatables.

If any of the activated confirm buttons are dwelled on for a time interval corresponding to a predetermined second time threshold (e.g. 400 ms, although this may be varied or customised in other embodiments as desired) in state 43, then the confirm button is considered to be actuated via gaze actuation. Dwelling on a confirm button can be detected by the gaze signal providing a gaze position sample that is substantially stationary within a target region, boundary or surface area of the associated confirm buttons, whether graphically presented or physically presented outside the display screen at virtual pixel coordinates as previously described. If actuated, the activatable (e.g. hyperlink in this example) temporarily associated with the confirm button is considered to be clicked or actuated. By way of example, in a gaze-controlled web browser, the browser jumps to or loads 44 the new location, file or webpage designated by the hyperlink as if the hyperlink had been clicked or activated by a click or touch input. The gaze-controlled interface algorithm then begins the visual identifier assignment stage all over again after rendering the new webpage, location or file at step 32, to allow the user to interact and/or navigate the new webpage in the same manner as above.

As shown at state 45, all the confirm buttons may be globally deactivated should the user scroll to update the main display window and restart the algorithm at state 38, such that scrolling acts as an interrupt to the algorithm. The user triggering a resize 46 of the display window may trigger the algorithm to re-start or transition to state 32.

Second Embodiment—Confirm Button Activation and Actuation

Reverting to FIG. 2B, after the element visual identifier assignment stage 34 and modification of the presentation of the electronic visual work to present or render the activatables with their assigned visual identifiers, the main gaze-controlled interface algorithm 47 begins. In this second embodiment, the main gaze-controlled algorithm 47 is an 'a posteriori analysis' algorithm. Initially, like the first embodiment, all the confirm buttons are in an inactive state 48.

In this second embodiment, as the user gazes on the electronic visual work, the algorithm enters a gaze recording state 49. In this gaze recording state, the algorithm records and stores, either temporarily or permanently, in memory gaze data representing the received gaze signal 26 from the gaze tracker 24. In a first form, the gaze recoding state 49 may be configured to record all gaze signals received continuously. In a second form, the gaze recording state 49 may be configured to only record periods of received gaze signals that represent when the user's gaze is detected as being stationary (for example using the algorithm of FIG. 5 or similar). In this second form, the gaze recording state may be configured to only store the gaze data from the most recent period of stationary gaze, i.e. purging all previous gaze data. In either case, the gaze data recorded comprises the gaze signal and any associated nearby activatables, for example those falling within a predetermined activation zone as described in the first embodiment. The algorithm remains in or repeats the gaze recording state 49 as long as the user's gaze is detected as staying on the electronic visual work (e.g. the webpage in this example).

If the user looks at a confirm button, the algorithm moves to state 54. In state 54, the algorithm implements a posterior analysis of the recorded or stored gaze data to determine the activatable that the user most likely intends to actuate. The algorithm may be configured to determine the activatable in various ways. In one embodiment, the most likely activatable with the same visual identifier as the confirm button being gazed at is chosen as the one that the user has most recently dwelled on or nearby for a certain time threshold. In another embodiment, the most likely activatable with the same visual identifier as the confirm button is chosen as the one that the user has dwelled on or nearby for the longest within a certain time period. In another embodiment, the most likely activatable with the same visual identifier as the confirm button is chosen based on the gaze path such as by ignoring any activatables that likely lie only coincidentally on the path between the most likely activatable and the confirm button. In another embodiment, the most likely activatable is chosen based on a combination of criteria and may even have a different visual identifier than the confirm button that was dwelled on, if it is likely that the user actually mean to dwell on a different confirm button.

Once the most likely activatable is identified, the confirm button is activated to be temporarily linked or associated with that identified activatable. The algorithm in state 54 then analyses the gaze signal to determine if the user has dwelled on the confirm button for a time interval corresponding to a predetermined time threshold (e.g. 400 ms in this example, although this may be modified or varied in alternative embodiments as desired). If the user is detected as dwelling on the activated confirm button for the predetermined threshold, the identified activatable temporarily linked to the confirm button is actuated.

4. General

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to portable or fixed storage devices, optical storage devices, and/or various other mediums capable of storing, containing or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated the figures may be rearranged and/or combined into a single component or embodied in several components without departing from the invention. Additional elements or components may also be added without departing from the invention. Additionally, the features described herein may be implemented in software, hardware, as a business method, and/or combination thereof.

In its various aspects, the invention can be embodied in a computer-implemented process, a machine (such as an electronic device, or a general purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

The foregoing description of the invention includes preferred forms thereof. Modifications may be made thereto without departing from the scope of the invention as defined by the accompanying claims.

The invention claimed is:

1. A method of providing a gaze-controlled interface for a user to interact with an electronic visual work presented on an electronic display screen, comprising:

providing a number of confirm buttons in the vicinity of the display screen at known fixed locations, each confirm button having a different fixed respective button visual identifier;

processing the electronic visual work to identify activatable elements of at least one type;

assigning an element visual identifier to each of the identified activatable elements, each element visual identifier corresponding to one of the button visual identifiers;

modifying the display of the electronic visual work to present the assigned element visual identifiers for at least a portion of the displayed activatable elements;

receiving a gaze signal representing the user's gaze position on the display screen from an eye gaze tracker;

sensing the user's gaze dwelling on or near an activatable element of the displayed electronic visual work based on the gaze signal;

activating the confirm button having the button visual identifier corresponding to the element visual identifier assigned to the dwelled-on activatable element such that the confirm button is temporarily linked to the dwelled-on activatable element so that actuation of the activated confirm button causes activation of the dwelled-on activatable element;

sensing actuation of the activated confirm button in response to the user's gaze dwelling on the activated confirm button based on the gaze signal; and activating the activatable element in response to the sensed actuation of the activated confirm button.

2. The method according to claim 1 wherein the method comprises providing a predetermined number of confirm buttons in the vicinity of the display screen at known fixed locations, each confirm button having a different fixed respective button visual identifier.

3. The method according to claim 1 wherein the confirm buttons are electronically generated graphical confirm buttons presented on the electronic display screen.

4. The method according to claim 1 comprising providing the confirm buttons in a margin relative to the displayed electronic visual work.

5. The method according to claim 1 wherein the confirm buttons are static in that they are permanently presented at their respective fixed locations while the electronic visual work is displayed.

6. The method according to claim 1 wherein the confirm buttons are physical confirm buttons in the form of physical markers or targets or indicia or printing or stickers provided adjacent or about the periphery of the electronic display screen.

7. The method according to claim 6 wherein the confirm buttons are provided along one or multiple frame work edges or borders of the electronic display screen or the housing or casing of an electronic device which provides the electronic display screen, or wherein the physical confirm buttons are provided on a panel or frame that is retrofittable to the electronic display screen or an electronic device which provides the electronic display screen.

8. The method according to claim 1 wherein the button visual identifiers are colour-based, with different colours associated with each confirm button, and each element visual identifier corresponding to one of the colours of the confirm buttons.

9. The method according to claim 1 wherein the button visual identifiers are pattern-based, with different patterns associated with each confirm button, and each element visual identifier corresponding to one of the patterns of the confirm buttons.

10. The method according to claim 1 wherein the button visual identifiers are shape-based, with different shapes associated with each confirm button, and each element visual identifier corresponding to one of the shapes of the confirm buttons.

11. The method according to claim 1 wherein the button visual identifiers are based on a combination of any two or more of colour, pattern, and/or shape, with a combination of any two or more colours, patterns, and/or shapes associated with each confirm button, and each element visual identifier corresponding to one of the combinations associated with the confirm buttons.

12. The method according to claim 1 comprising processing the electronic visual work to identify activatable elements of a single type or multiple types, and wherein the activatable elements are any one or more of the following types: icons, widgets, areas, menus, buttons, fields, hyperlinks.

13. The method according to claim 1 wherein the step of assigning an element visual identifier to each identified activatable element comprises assigning element visual identifiers such that the minimum distance between activatable elements having the same or similar element visual identifiers is maximised.

14. The method according to claim 1 wherein the step of assigning an element visual identifier to each identified activatable element comprises assigning element visual identifiers so that for neighbouring activatable elements the distance between the confirm buttons having button visual identifiers corresponding to the assigned element visual identifiers of the neighbouring activatable elements is maximized.

15. The method according to claim 1 wherein the step of modifying the display of the electronic visual work to present the assigned element visual identifiers comprises presenting the assigned element visual identifiers for all displayed activatable elements.

16. The method according to claim 1 wherein the step of modifying the display of the electronic visual work to present the assigned element visual identifiers comprises dynamically presenting the assigned element visual identifiers for a portion of the displayed activatable elements that are captured within a predefined region centered about the user's gaze position on the display screen.

17. The method according to claim 1 wherein the step of modifying the display of the electronic visual work to present the assigned element visual identifiers comprises providing an electronic masking overlay over at least a portion of the presented electronic visual work.

18. The method according to claim 17 wherein where the button and element visual identifiers correspond to colours, patterns or shapes, the masking overlay highlights, borders, outlines, underlines or otherwise applies for display the assigned colours, patterns or shapes, respectively, of the element visual identifiers to their respective activatable elements of the electronic visual work.

19. The method according to claim 1 wherein the step of modifying the display of the electronic visual work to present the assigned element visual identifiers comprises modifying the data file of the electronic visual work to modify the display or control the rendering of the activatable elements in the electronic visual work to display their respective assigned element visual identifier.

20. The method according to claim 1 wherein the step of modifying the display of the electronic visual work comprises modifying the layout of the electronic visual work to modify the relative position of activatable elements to increase the separation of activatable elements having the same assigned element visual identifier.

21. The method according to claim 1 wherein the step of sensing the user's gaze dwelling on or near an activatable element based on the gaze signal comprises sensing whether the user's gaze has being substantially stationary for a time interval corresponding to a time threshold.

22. The method according to claim 21 wherein the user's gaze is considered to be substantially stationary if for the time interval corresponding to the time threshold each successive gaze signal sample representing the user's gaze position is within a predetermined distance of the previous sample defined by a predetermined distance threshold or parameter.

23. The method according to claim 22 wherein successive gaze position samples are considered to be within a predetermined distance if one of the sample positions falls within a circular gaze area of predetermined radius centered about the other gaze position sample.

24. The method according to claim 1 wherein the method comprises only activating the confirm button having the button visual identifier corresponding to the assigned element visual identifier of the activatable element being dwelled on.

25. The method according to claim 1 wherein the method comprises activating any confirm button having a button visual identifier that corresponds to an assigned element visual identifier of any activatable elements falling within a predetermined activation zone relative to a gaze area being dwelled on as defined by the gaze signal.

26. The method according to claim 25 wherein the predetermined activation zone is configured to be of a size that captures the maximum number of activatable elements in the vicinity of the gaze area but without capturing activatable elements having the same assigned element visual identifier.

27. The method according to claim 1 wherein sensing the user's gaze dwelling on an activated confirm button comprises sensing the user's gaze as being substantially stationary on a confirm button for a time interval corresponding to a time threshold.

28. The method according to claim 1 wherein electronic visual work is any one of the following: webpage, document, or graphical user interface.

29. A gaze-controlled interface system for enabling a user to interact with an electronic visual work presented on an electronic display screen, comprising:
- an electronic display screen configured to present the electronic visual work;
- an eye gaze tracker configured to sense the user's gaze position on the display screen and generate representative gaze signal; and
- a processor operatively connected to the display screen and eye gaze tracker, and which is programmed to execute the method according to claim 1.

30. A non-transitory computer-readable medium having stored thereon computer executable instructions that, when executed on a processing device or devices, cause the processing device or devices to perform the method according to claim 1.

* * * * *